(12) United States Patent
Hsu et al.

(10) Patent No.: US 6,975,485 B2
(45) Date of Patent: *Dec. 13, 2005

(54) THIN FILM MAGNETIC RECORDING INDUCTIVE WRITE HEAD WITH LAMINATED WRITE GAP

(75) Inventors: Yimin Hsu, Sunnyvale, CA (US); Ching Hwa Tsang, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/890,658

(22) Filed: Jul. 13, 2004

(65) Prior Publication Data

US 2004/0257699 A1 Dec. 23, 2004

Related U.S. Application Data

(63) Continuation of application No. 10/147,565, filed on May 15, 2002, now Pat. No. 6,833,976.

(51) Int. Cl.[7] ............................................. G11B 5/127
(52) U.S. Cl. ...................................... 360/119; 360/121
(58) Field of Search ........................ 360/119, 120, 121, 360/125, 126

(56) References Cited

U.S. PATENT DOCUMENTS

| | | | |
|---|---|---|---|
| 3,098,126 A | * | 7/1963 | Kaspaul ...................... 360/120 |
| 3,485,962 A | * | 12/1969 | Barnes ........................ 360/120 |
| 3,975,773 A | | 8/1976 | Dejouhanet et al. |
| 4,180,835 A | | 12/1979 | Okumura et al. |
| 4,404,609 A | | 9/1983 | Jones |
| 4,622,614 A | | 11/1986 | Yamashita et al. |
| 4,669,015 A | | 5/1987 | Ruigrok |
| 4,672,493 A | | 6/1987 | Schewe |
| 4,742,412 A | | 5/1988 | Kuriyama |
| 4,768,118 A | | 8/1988 | Kuriyama |
| 4,780,779 A | * | 10/1988 | Pisharody et al. .......... 360/120 |
| 4,825,318 A | | 4/1989 | Hoo et al. |

(Continued)

FOREIGN PATENT DOCUMENTS

DE 4026316 A1 3/1991

(Continued)

OTHER PUBLICATIONS

Luo et al., "Write bubble and field rise time measurements", J. Appl. Phys., vol. 85, No. 8, Apr. 15, 1999, pp. 5867-5869.

(Continued)

*Primary Examiner*—William J Klimowicz
(74) *Attorney, Agent, or Firm*—Thomas R. Berthold; Daniel E. Johnson

(57) ABSTRACT

A thin film inductive write head for magnetic recording has a write gap formed as a lamination of alternating layers of a nonmagnetic gap layer and a ferromagnetic spacer layer. There are N gap layers and N–1 spacer layers, with each pole tip of the write head being located adjacent to a gap layer. The spacer layers in the gap structure are formed of a ferromagnetic material with a high saturation moment density ($B_S$) that is close to the $B_S$ of the spacer material from which the pole tips are formed. Unlike the pole tips, the spacer layers are not part of a magnetic circuit and are magnetically isolated, i.e., completely surrounded by nonmagnetic gap material. The effect of the spacer layers is to effectively divide the gap into a plurality of smaller gaps. The write head with the laminated gap creates a write bubble that is narrower in the off-track direction and wider in the in-track direction.

28 Claims, 3 Drawing Sheets

U.S. PATENT DOCUMENTS

| | | | |
|---|---|---|---|
| 5,014,149 A * | 5/1991 | Ibaraki | 360/126 |
| 5,103,553 A | 4/1992 | Mallary | |
| 5,111,352 A | 5/1992 | Das et al. | |
| 5,729,413 A * | 3/1998 | Gooch et al. | 360/125 |
| 5,802,700 A | 9/1998 | Chen et al. | |
| 6,072,669 A | 6/2000 | Indeck | |
| 6,833,976 B2 * | 12/2004 | Hsu et al. | 360/119 |

FOREIGN PATENT DOCUMENTS

| | | | | |
|---|---|---|---|---|
| EP | 390347 A2 | 10/1990 | | |
| JP | 56080817 A | 7/1981 | | |
| JP | 62140217 A * | 6/1987 | | G11B 5/31 |
| JP | 05159216 A | 6/1993 | | |
| JP | 07320206 A | 12/1995 | | |
| JP | 11086213 A | 3/1999 | | |

OTHER PUBLICATIONS

Steiner, "Write Bubble Measurement Under Realistic Recording Conditions", IEEE Trans Mag, vol. 37, No. 4, Jul. 4, 2001, pp. 1334-1336.

* cited by examiner

THIN FILM MAGNETIC RECORDING INDUCTIVE WRITE HEAD WITH LAMINATED WRITE GAP

This application is a continuation of U.S. application Ser. No. 10/147,565 titled "THIN FILM MAGNETIC RECORDING INDUCTIVE WRITE HEAD WITH LAMINATED WRITE GAP", filed May 15, 2002 (which issued as U.S. Pat. No. 6,833,976), the disclosure of which is hereby incorporated by reference in its entirety.

TECHNICAL FIELD

This invention relates generally to a thin film inductive write head for magnetic recording, and more particularly to a thin film write head having an improved write gap.

BACKGROUND OF THE INVENTION

In a magnetic recording disk drive, data is written by thin film magnetic transducers called "write heads" that are supported over the surface of the disk while the disk is rotated at high speed. Each write head is located on the trailing surface of a slider that is supported by a thin cushion of air (an "air bearing") produced by the disk's high rotational speed.

A prior art thin film inductive write head is shown in the side sectional view of FIG. 1 and the partial end view, as seen from the disk, of FIG. 2. FIG. 1 also depicts the pole tips facing a magnetic recording disk that has a magnetic layer ML on the disk substrate SB and a protective overcoat OC on the ML. The distance D from the ends of the pole tips to the middle of the ML is referred to as the magnetic spacing. The write head includes a coil C located between bottom and top pole pieces P1 and P2, respectively. The pole pieces are formed from thin films ("layers") of magnetic material and have a pole tip height dimension commonly called the "throat height". The throat height is measured between an air-bearing surface ("ABS"), formed by polishing the tips of the pole pieces, and a "zero throat level", where the bottom pole piece P1 and the top pole piece P2 converge at the write gap G. A thin film inductive write head also includes a "pole tip region" which is located between the ABS and the zero throat level, and a "back region" which extends back from the zero throat level to and including a back gap BG. Each pole piece has a pole tip in the pole tip region and a back portion in the back region. The pole pieces are connected together at the back gap BG. The pole tips are extensions of the bottom and top pole pieces P1 and P2 of the write head. Each of the pole pieces P1 and P2 transitions to a pole tip (PT2 and PT1$a$, Pt1$b$) in the pole tip region. The pole tips are separated by a gap G, which is a thin layer of nonmagnetic material, typically sputter deposited insulating alumina ($Al_2O_3$) or plated nickel-phosphorous (NiP). During the write process, write currents are sent to the coil C and a magnetic field is generated across the write gap G. The fringing field from the write gap G is used to reverse the magnetization in the magnetic layer ML, resulting in the recording of data on the disk. The width W of the pole tip PT2 (FIG. 2) determines the width of the data track on the disk.

The write head shown in FIGS. 1 and 2 is depicted as part of a prior art "merged" read/write head that employs a magnetoresistive ("MR") read element and an inductive write element in combination. The MR read element is located between bottom shield S1 and top shield S2. The bottom shield S1 is formed on a substrate, typically the trailing surface of an air-bearing slider. The top shield S2 also functions as the bottom pole P1 of the write head. In the merged MR head the pole tip of pole P1 is constructed as a narrow "pedestal" pole tip portion PT1$b$ on top of the second shield layer S2, as shown in FIG. 2, with the P1/S2 layer then serving as a wider bottom pole tip portion PT1$a$. Both of these pole tip portions PT1$b$ and PT1$a$ form the pole tip of the bottom pole P1, with the pole tip portion PT1$b$ forming a pedestal on the pole tip portion PT1$a$. In the write head shown in FIG. 1, the throat height is less than the height of PT1$b$ because P2 does not converge at precisely where PT1$b$ begins but at a point closer to the ABS.

The write field contour generated by the pole tips of a thin field inductive write head has a three-dimensional shape, referred to as the write "bubble". The shape of the write bubble is defined by all points in space where the field is equal to the write threshold, which is the field strength sufficient to change the magnetization in the magnetic layer of the disk, i.e., the coercivity of the magnetic layer. For a given deep-gap field at the throat region of the write head, a larger write gap results in a wider write bubble along the in-track direction to yield better overwrite performance, i.e., the ability to overcome the influence of previously written data. However, a larger write gap also results in a wider write bubble in the off-track direction to yield a wider data track, thereby decreasing the track density that can be achieved on the disk.

To improve on this fundamental tradeoff between overwrite performance versus track density, what is needed is a thin film inductive write head that can create an improved write bubble geometry with a higher in-track to off-track aspect ratio. Such an improvement is especially desirable for very high data density applications, where overwrite performance is typically severely compromised by the need for small write gaps to maintain closely-spaced and narrow data tracks.

SUMMARY OF THE INVENTION

The invention is a thin film inductive write head with a write gap formed as a lamination of alternating layers of a nonmagnetic gap layer and a ferromagnetic spacer layer. There are N gap layers and N−1 spacer layers, with each pole tip of the write head being located adjacent to a gap layer. The spacer layers in the gap structure are formed of a ferromagnetic material with a high saturation moment density ($B_S$) that is close to the $B_S$ of the spacer material from which the pole tips are formed. Unlike the pole tips, the spacer layers are not part of a magnetic circuit and are magnetically isolated, i.e., completely surrounded by nonmagnetic gap material. The effect of the spacer layers is to effectively divide the gap into a plurality of smaller gaps. The write head with the laminated gap produces a write bubble that is narrower in the off-track direction and larger in the in-track direction with track edge writing similar to that of a small gap write head.

For a fuller understanding of the nature and advantages of the present invention, reference should be made to the following detailed description taken together with the accompanying figures.

DETAILED DESCRIPTION OF THE INVENTION

Figure 1:
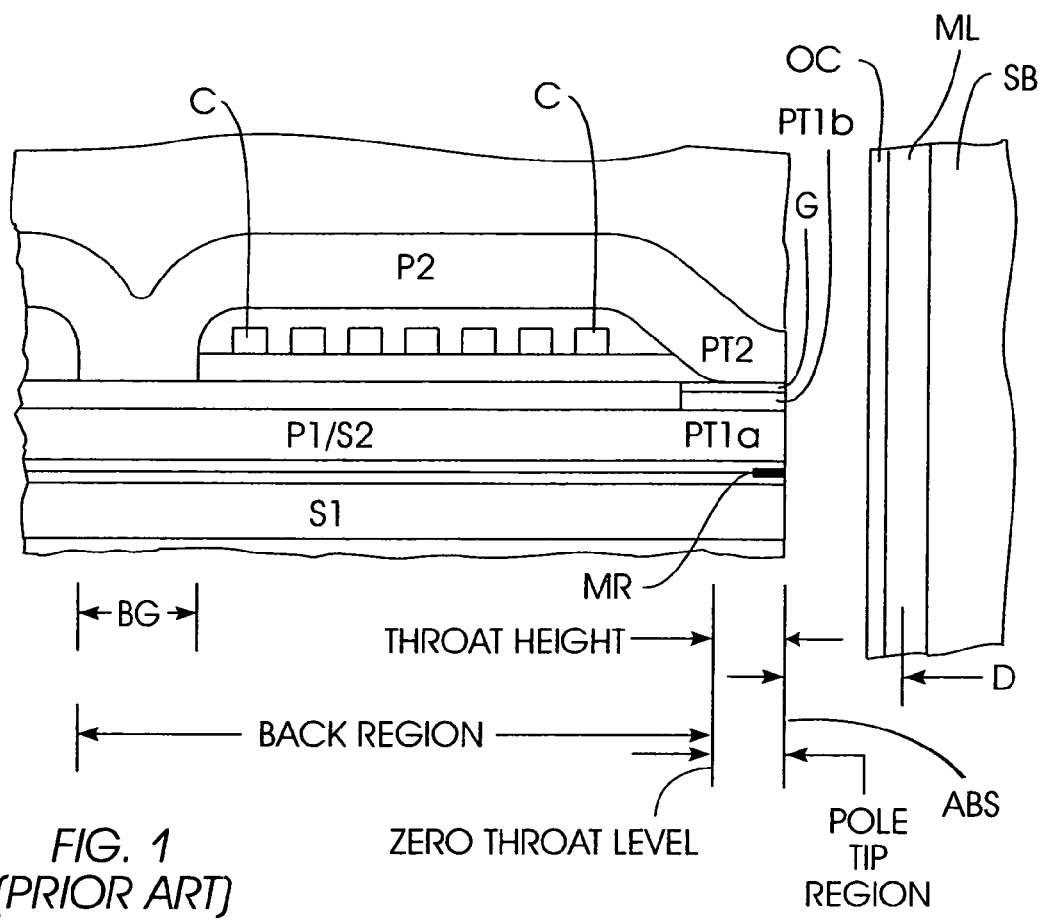
FIG. 1 is a side sectional view of a prior art thin film inductive write head with its pole tips facing a magnetic recording disk.
Figure 2:
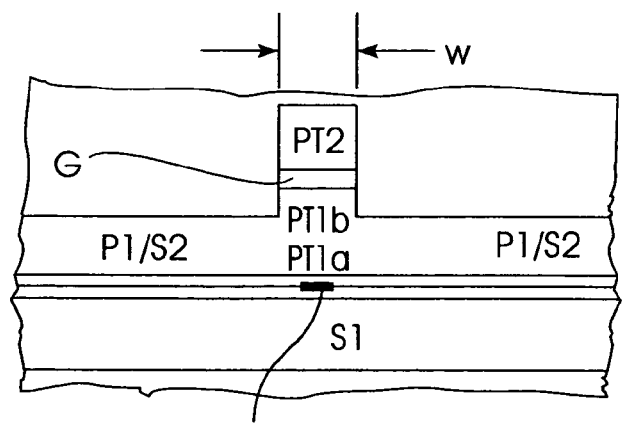
FIG. 2 is the prior art thin film inductive write head of FIG. 1 shown in partial end view, as seen from the disk.
Figure 3:
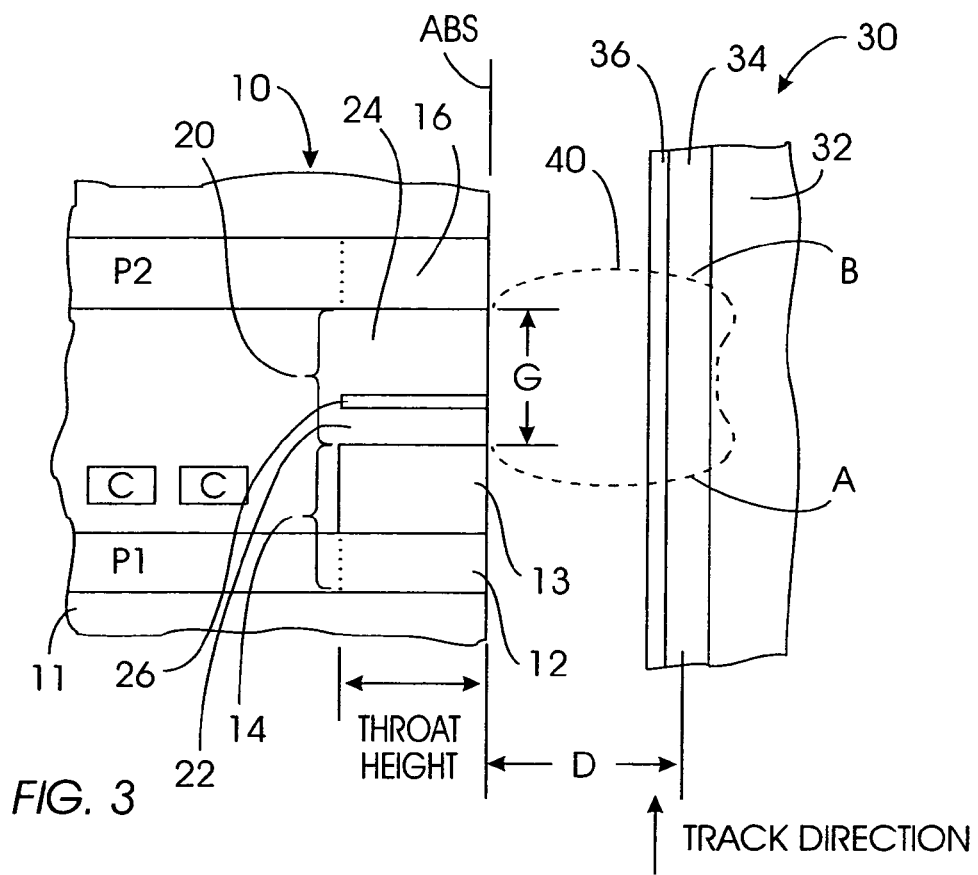
FIG. 3 a side sectional view of the thin film inductive write head of the present invention illustrating the laminated write gap and with its pole tips facing a magnetic recording disk.
Figure 4:
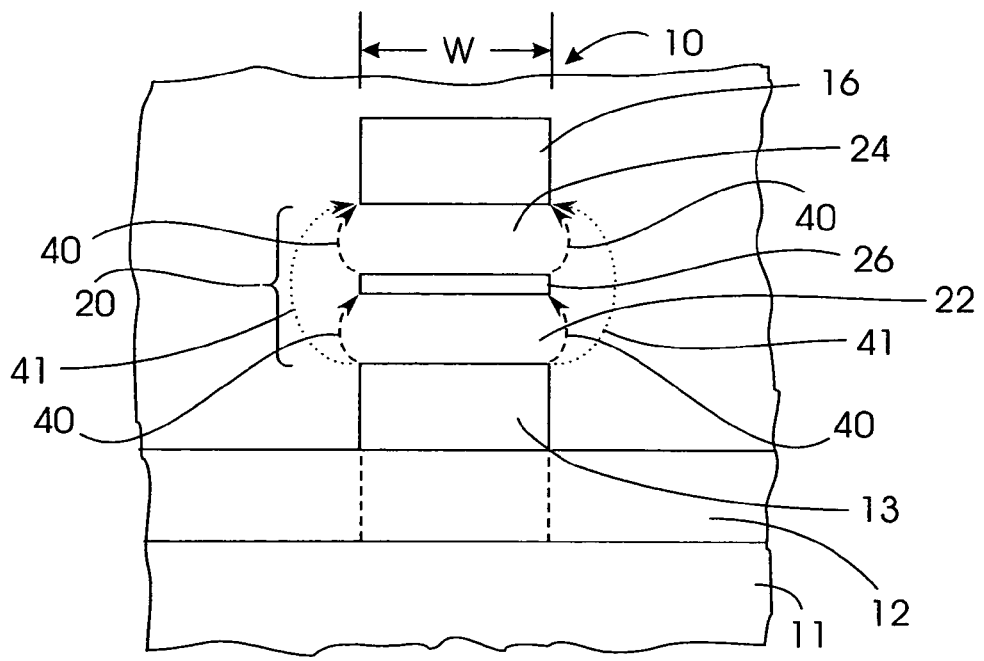
FIG. 4 is the thin film inductive write head of FIG. 3 shown in partial end view, as seen from the disk.

The present invention is shown in the side sectional view of FIG. 3, where the thin film inductive write head 10 is shown with its air-bearing surface (ABS) facing a magnetic recording disk 30. FIG. 4 is a view of the head 10 as it would be seen from the disk with the ABS being in the plane of the paper. The head 10 is a series of layers formed on a substrate 11, which is typically the trailing surface of an air-bearing slider. The head has a lower or first pole P1 formed of ferromagnetic material with a pole tip 14 that includes a bottom pole tip portion 12 and a "pedestal" pole tip portion 13 on top of bottom pole tip portion 12. The head has an upper or second pole P2 formed of ferromagnetic material that includes a portion that serves as a pole tip 16. Portions of the electrically conductive coil C are shown between poles P1 and P2. The pole tips 14, 16 have a "throat height" defined by the "height" of the pedestal pole tip portion 13.

The disk 30 includes a substrate 32, magnetic layer 34 and protective overcoat 36. The head 10 is designed to operate at a magnetic spacing D, defined as the distance between the ends of pole tips 14, 16 and the middle of magnetic layer 34. The write bubble generated by the pole tips 14, 16 when write current is directed through coil C is depicted by the dashed line 40. At all places inside the write bubble the magnetic field is sufficient to cause a magnetization reversal in the magnetic layer 34. The dashed line 40 is a section of the three-dimensional write bubble that intersects the magnetic layer 34 parallel to the data track. Thus the region of magnetic layer 34 between points A and B will have its magnetization reversed by the presence of the write field.

In the present invention the gap structure is a lamination of alternating layers of a nonmagnetic gap layer and a ferromagnetic spacer layer, where there are N gap layers and N−1 spacer layers (N≧2). The pole tips 14, 16 are separated by a gap structure 20 that has a thickness G, with G being equal to the sum G' of the thicknesses $G_i$ of the N gap layers and the sum S' of the thicknesses $S_i$ of the N−1 spacer layers. G' is selected to be typically between D and 5D, and S' is selected to be between 0.2D and 2D. In FIGS. 3 and 4 the gap structure 20 is shown with two gap layers 22, 24 and a single spacer layer 26 (N=2). Thus for D=20 nm and G'=3D=60 nm, each of the gap layers 22, 24 can have a thickness of 30 nm and the spacer layer 26 can have a thickness of 4 nm to 40 nm. The gap thickness G in this example would then be between 64 nm to 100 nm (0.07G'<S'<0.7G'). The gap structure 20 has an end face that includes the ends of pole tips 14, 16 and is coplanar with the ABS.

The spacer layers in the gap structure are formed of a ferromagnetic material with a high saturation moment density ($B_S$). The $B_S$ of the spacer material should be close to the $B_S$ of the material from which the pole pieces are formed, i.e., preferably at least 0.6 times the $B_S$ of the pole piece material. Typical materials for use as the ferromagnetic pole pieces and laminated gap spacer layers are high $B_S$ alloys, such as CoFe, CoNiFe, FeN, and NiFe alloys, in particular CoFe (2.4 Tesla) and $Ni_{(x)}Fe_{(100-x)}$ where x is less than 50. Examples of such NiFe alloys include $Ni_{45}Fe_{55}$ (1.7 Tesla) and $Ni_{32}Fe_{68}$ (2.0 Tesla). Unlike the pole pieces, the spacer layers are not part of a magnetic circuit and are magnetically isolated, i.e., completely surrounded by nonmagnetic gap material. In FIG. 3, the spacer layer 26 is illustrated with a height equal to the throat height. However, the spacer layer can have a height less than the throat height and up to four times greater than the throat height.

The write head with laminated write gap is formed with a slight modification to the conventional process for fabricating write heads. Referring to FIG. 3, a layer of alumina to serve as gap layer 22 is deposited over pole tip 14, followed by a layer of ferromagnetic spacer material. Then the region that will become the spacer layer 26 is patterned with photoresist and the ferromagnetic layer etched back down to expose the alumina layer, leaving only layer 26 in the pole tip region. Next a re-fill process fills alumina in the previously etched region, resulting in more alumina in the back region and creating the second gap layer 24 over the spacer layer 26.

An advantage of the present invention is illustrated in FIG. 4 which shows a section of the three-dimensional write bubble in the plane of the ABS (dashed line 40) created by the head with the laminated write gap with two gap layers with total thickness G'. The effect of the spacer layer 26 is to separate the gap into two smaller gaps. By comparison, a conventional write head with a gap thickness G', but without a ferromagnetic spacer layer, creates a write bubble that is wider at the track edges (dotted line 41). The narrower write bubble at the track edges results in greater track density. The effect of the spacer layer 26 on the write bubble can also be seen in FIG. 3 by the portion of dashed line 40 that extends beyond the magnetic layer 34 and into the substrate 32. The write bubble is essentially "flattened" out in this region, resulting in a wider write bubble in the in-track direction (between points A and B).

Figure 5:
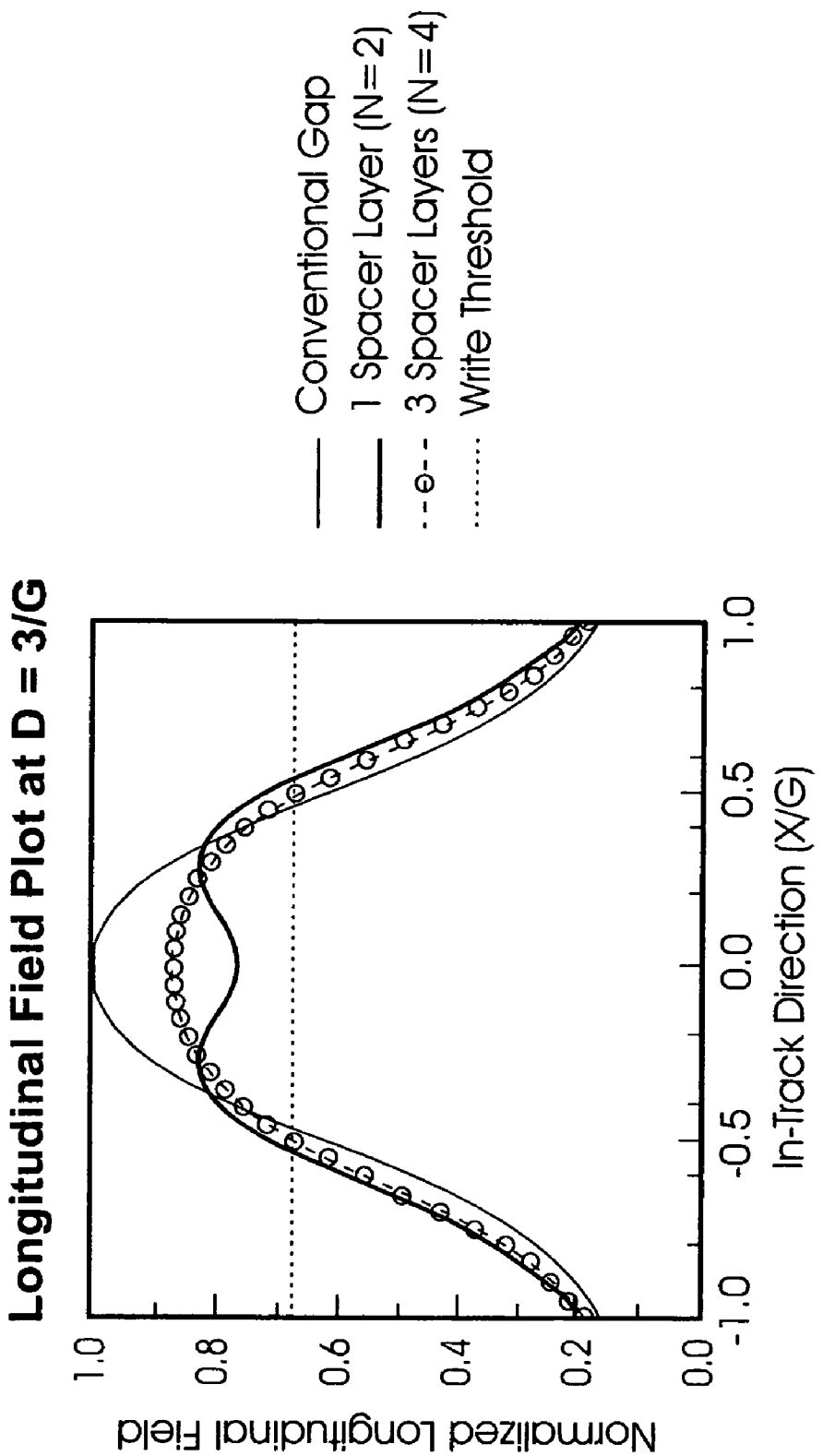
FIG. 5 is a plot of magnetic field as a function of in-track position for three types of write heads, all with the same gap thickness, illustrating the improvement in in-track write bubble size for the heads with laminated gaps.

FIG. 5 illustrates another advantage of the present invention, namely a larger write bubble in the in-track. FIG. 5 is a plot of the field in the in-track direction as a function of distance from either side of the center of the write gap for three different write heads, all with G=3D. The thin line is for a head with no spacer layer in the gap, the thick line is for a head with a single spacer layer (N=2) of thickness S'=0.2G', and the connected circles are for a head with three spacer layers (N=4) with total thickness S'=0.2G'. The horizontal line in the plot is the write threshold and the intersection of this line with each of the write field curves indicates the radius of the associated write bubble in the in-track direction.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A method of constructing a thin film inductive write head having a write bubble, the method including forming first and second ferromagnetic pole pieces each of which has a pole tip, an electrically conductive coil structure between the first and second pole pieces, and a gap structure between the pole tips that includes i) a first nonmagnetic gap layer adjacent to the first pole tip, ii) a second nonmagnetic gap layer adjacent to the second pole tip, and iii) a ferromagnetic spacer layer between the first and second gap layers, wherein the improvement comprises:

selecting the thicknesses of the gap layers and the spacer layer to narrow the write bubble in an off-track direction of a magnetic recording medium, wherein the head has a design magnetic spacing D, wherein G' is the sum of the thicknesses of the first and second gap layers and wherein G' is between D and 5D.

2. The method of claim 1 wherein the spacer layer is formed of a material with a saturation moment density greater than or equal to 0.6 times the saturation moment density of the material from which the second pole tip is formed.

3. The method of claim 1 wherein the spacer layer is formed of a material selected from the group consisting of alloys of CoFe, CoNiFe, FeN and NiFe.

4. The method of claim 3 wherein the spacer layer is formed of $Ni_{(x)}Fe_{(100-x)}$ where x is less than 50.

5. The method of claim 1 wherein the first pole tip is a pedestal pole tip on the first pole piece, the pedestal pole tip having front and rear ends defining a first pole tip height.

6. The method of claim 5 wherein the spacer layer has a front end generally coplanar with the front end of the first pole tip and a height equal to or less than the first pole tip height.

7. The method of claim 5 wherein the spacer layer has a front end generally coplanar with the front end of the first pole tip and a height less than four times the first pole tip height.

8. The method of claim 1 wherein G' is the sum of the thicknesses of the first and second gap layers, wherein S' is the thickness of the spacer layer, and wherein S' is between 0.07G' and 0.7G'.

9. The method of claim 1 wherein the gap layers are formed of alumina.

10. The method of claim 1 wherein the gap layers are formed of NiP.

11. A method of constructing a thin film inductive write head having a write bubble, the method including:

forming on the substrate a first ferromagnetic pole piece that has a pole tip with a front end;

forming on the first pole tip a gap structure that has a front end face; and forming on the gap structure a second ferromagnetic pole piece that has a pole tip and a front end, wherein the front ends of the first and second pole tips and the front end face of the gap structure are coplanar, and wherein the gap structure includes alternating layers of a nonmagnetic gap layer and a ferromagnetic spacer layer, there being N gap layers and N−1 spacer layers where N is greater than 2, and wherein the thicknesses of the alternating layers are selected to narrow the write bubble in as off-track direction of a magnetic recording medium, and wherein the head has a design magnetic spacing D, wherein G' is the sum of the thicknesses of the N gap layers and wherein G' is between D and 5D.

12. The method of claim 11 wherein each spacer layer is formed of a material with a saturation moment density greater than or equal to 0.6 times the saturation moment density of the material from which the second pole tip is formed.

13. The method of claim 11 wherein the spacer layer is formed of a material selected from the group consisting of alloys of CoFe, CoNiFe, FeN and NiFe.

14. The method of claim 11 wherein the spacer layer is formed of $Ni_{(x)}Fe_{(100-x)}$ where x is less than 50.

15. The method of claim 11 wherein the first pole tip is a pedestal pole tip on the first pole piece, the pedestal pole tip having front and rear ends defining a first pole tip height.

16. The method of claim 15 wherein each spacer layer has both a front end generally coplanar with the front end face of the gap structure and a rear end, the height of each spacer layer between its front and rear ends being equal to or less than the first pole tip height.

17. The method of claim 15 wherein each spacer layer has both a front end generally coplanar with the front end face of the gap structure and a rear end, the height of each spacer layer between its front and rear ends being less than four times the first pole tip height.

18. The method of claim 11 wherein S' is the sum of the thicknesses of the N−1 spacer layers and is between 0.07G' and 0.7G'.

19. The method of claim 11 wherein each of the gap layers is formed of alumina.

20. The method of claim 11 wherein each of the gap layers is formed of NiP.

21. The method of claim 11 wherein the substrate is the trailing surface of an air-bearing slider.

22. A method, comprising:

laminating alternating layers of a nonmagnetic gap layer and a ferromagnetic spacer layer to form a gap structure between first and second pole tips of a thin film inductive write head, wherein the thicknesses of the layers are selected to narrow the write bubble in an off-track direction of a magnetic recording medium, there being N gap layers and N−1 spacer layers where N is greater than 2, and wherein the head has a design magnetic spacing D, wherein G' is the sum of the thicknesses of the N gap layers and wherein G' is between D and 5D.

23. The method of claim 22, wherein the thicknesses are also selected to widen the write bubble in an in-track direction of a magnetic recording medium.

24. The method of claim 22, wherein the ferromagnetic layers of the gap structure are magnetically isolated.

25. The method of claim 24, comprising:
depositing gap layer material over the first pole tip;
depositing a layer of ferromagnetic spacer material over the gap layer material;
patterning the layer of ferromagnetic spacer material with photoresist;
etching the ferromagnetic spacer material to expose the gap layer material, so that ferromagnetic spacer material only remains at a pole tip region; and
depositing gap layer material over the etched ferromagnetic spacer material.

26. The method of claim 22 wherein S' is the sum of the thicknesses of the N−1 spacer layers and is between 0.07G' and 0.7G'.

27. A method of constructing a thin film inductive write head having a write bubble, the method including providing a substrate, forming on the substrate a first ferromagnetic pole piece that has a pole tip with a front end, forming on the first pole tip a gap structure that has a front end face, and forming on the gap structure a second ferromagnetic pole piece that has a pole tip and a front end, wherein the front ends of the first and second pole tips and the front end face of the gap structure are coplanar, and wherein the gap structure includes alternating layers of a nonmagnetic gap layer and a ferromagnetic spacer layer, there being N gap layers and N−1 spacer layers where N is greater than or equal to 2, wherein the improvement comprises:

selecting the thicknesses of the alternating layers to narrow the write bubble in an off-track direction of a magnetic recording medium, wherein the head has a design magnetic spacing D, wherein G' is the sum of the thicknesses of the N gap layers, and wherein S' is the sum of the thicknesses of the N−1 spacer layers and is between 0.07G' and 0.7G'.

28. The method of claim 27 wherein G' wherein G' is between D and 5D.

* * * * *